(12) United States Patent
Inskip, VI et al.

(10) Patent No.: US 12,100,420 B2
(45) Date of Patent: Sep. 24, 2024

(54) SPEECH DETECTION USING MULTIPLE ACOUSTIC SENSORS

(71) Applicant: Google LLC, Mountain View, CA (US)

(72) Inventors: Thomas William Inskip, VI, Seattle, WA (US); Jamie Alexander Zyskowski, Seattle, WA (US)

(73) Assignee: Google LLC, Mountain View, CA (US)

( * ) Notice: Subject to any disclaimer, the term of this patent is extended or adjusted under 35 U.S.C. 154(b) by 295 days.

(21) Appl. No.: 17/691,289

(22) Filed: Mar. 10, 2022

(65) Prior Publication Data

US 2023/0260538 A1     Aug. 17, 2023

Related U.S. Application Data

(60) Provisional application No. 63/310,371, filed on Feb. 15, 2022.

(51) Int. Cl.
| | |
|---|---|
| *G10L 25/78* | (2013.01) |
| *G01C 19/00* | (2013.01) |
| *G01P 1/02* | (2006.01) |
| *G01P 13/00* | (2006.01) |
| *G01P 15/08* | (2006.01) |
| *G10L 15/22* | (2006.01) |
| *G10L 15/24* | (2013.01) |
| *G10L 25/06* | (2013.01) |
| *G10L 25/21* | (2013.01) |

(52) U.S. Cl.
CPC .............. *G10L 25/78* (2013.01); *G01C 19/00* (2013.01); *G01P 1/02* (2013.01); *G01P 13/00* (2013.01); *G01P 15/08* (2013.01); *G10L 15/22* (2013.01); *G10L 15/24* (2013.01); *G10L 25/06* (2013.01); *G10L 25/21* (2013.01)

(58) Field of Classification Search
CPC ......... G10L 25/78; G10L 15/22; G10L 15/24; G10L 25/06; G10L 25/21; G10L 25/51; G01C 19/00; G01C 21/10; G01P 1/02; G01P 13/00; G01P 15/08
USPC ........................................................ 704/251
See application file for complete search history.

(56) References Cited

U.S. PATENT DOCUMENTS

| | | | |
|---|---|---|---|
| 10,431,238 B1 * | 10/2019 | Biruski .................. | G10L 25/06 |
| 10,629,226 B1 * | 4/2020 | Tong ...................... | G10L 15/08 |
| 10,636,405 B1 | 4/2020 | Kemmerer | |
| 11,232,800 B2 * | 1/2022 | Lee ......................... | G06F 3/167 |
| 11,350,851 B2 * | 6/2022 | Chandel ................ | A61B 5/6807 |
| 11,521,376 B1 * | 12/2022 | Dhua ..................... | G06T 7/70 |
| 11,609,242 B1 * | 3/2023 | Martin ................... | G01P 13/00 |

(Continued)

*Primary Examiner* — Thuykhanh Le
(74) *Attorney, Agent, or Firm* — Colby Nipper PLLC

(57) ABSTRACT

Aspects of the disclosure relate to voice activity detection (VAD) on wearable and other resource-constrained devices, to classify speech recorded by a microphone of the device as belonging to a wearer of the device versus another speech source. A computing device can include a microphone and an inertial measurement unit (IMU). The wearable device can use signals measured by the IMU for providing motion-tracking features, such as head tracking for augmented reality or virtual reality applications. Aspects of the disclosure provide for a device for leveraging existing data collected for these motion-tracking features for use in VAD. A device can pre-process data streamed from an IMU to use only signals predetermined to be indicative of whether or not a wearer of the device is speaking.

20 Claims, 7 Drawing Sheets

(56) References Cited

U.S. PATENT DOCUMENTS

| | | | |
|---|---|---|---|
| 11,851,049 B1* | 12/2023 | Bethanabhotla | H04R 1/08 |
| 2015/0245129 A1* | 8/2015 | Dusan | G10L 21/0208 |
| | | | 381/71.6 |
| 2015/0341549 A1* | 11/2015 | Petrescu | H04N 23/64 |
| | | | 348/207.1 |
| 2017/0082649 A1* | 3/2017 | Tu | G01P 13/00 |
| 2017/0146347 A1* | 5/2017 | Sotak | G01C 19/00 |
| 2017/0263267 A1* | 9/2017 | Dusan | H04R 1/1083 |
| 2017/0365249 A1* | 12/2017 | Dusan | G10L 15/05 |
| 2018/0047386 A1* | 2/2018 | Garner | G10L 15/22 |
| 2018/0068671 A1* | 3/2018 | Fawaz | G10L 25/78 |
| 2019/0122652 A1* | 4/2019 | Lacson | G10L 15/05 |
| 2019/0272842 A1* | 9/2019 | Bryan | G10L 21/0272 |
| 2019/0351910 A1* | 11/2019 | Kassen | B60W 10/12 |
| 2020/0011669 A1* | 1/2020 | Seth | G01C 21/1654 |
| 2020/0279561 A1 | 9/2020 | Sheeder et al. | |
| 2020/0335128 A1 | 10/2020 | Sheeder et al. | |
| 2020/0380955 A1* | 12/2020 | Lesso | G06F 1/163 |
| 2021/0095966 A1* | 4/2021 | Li | G01P 15/08 |
| 2021/0348435 A1* | 11/2021 | Ivanovic | G01C 19/00 |
| 2021/0383824 A1* | 12/2021 | Condorelli | H03G 3/342 |
| 2021/0409878 A1* | 12/2021 | Pedersen | H04R 25/405 |
| 2022/0103927 A1* | 3/2022 | Bhowmik | G06F 3/011 |
| 2022/0192498 A1* | 6/2022 | DiBello | A61B 5/6812 |
| 2022/0218941 A1* | 7/2022 | Vu | G16H 50/20 |
| 2022/0268620 A1* | 8/2022 | Schiller | G06Q 10/087 |
| 2022/0270593 A1* | 8/2022 | Rivolta | G10L 25/30 |
| 2022/0299542 A1* | 9/2022 | Ramalho Ferreira | G16H 40/63 |
| 2022/0308718 A1* | 9/2022 | Klein | G10L 15/08 |
| 2022/0308828 A1* | 9/2022 | Knapp | G10L 15/1815 |
| 2022/0315070 A1* | 10/2022 | Kuwashiro | G01C 19/00 |
| 2022/0339444 A1* | 10/2022 | Vu | A61N 1/36036 |
| 2022/0364882 A1* | 11/2022 | Gaskell | G01C 19/5776 |
| 2022/0368554 A1* | 11/2022 | Williams | H04L 12/1827 |
| 2023/0003528 A1* | 1/2023 | Santos | G01C 21/16 |
| 2023/0045064 A1* | 2/2023 | Alessi | G10L 15/22 |
| 2023/0138557 A1* | 5/2023 | LaBorde | G10L 25/63 |
| | | | 705/2 |
| 2023/0254650 A1* | 8/2023 | Lovchinsky | H04R 25/609 |
| 2023/0277071 A1* | 9/2023 | D'Mello | A61B 5/7235 |
| | | | 600/485 |
| 2023/0352037 A1* | 11/2023 | Elgee | G10L 21/0208 |
| 2024/0050807 A1* | 2/2024 | Zhang | A63B 71/0605 |

* cited by examiner

SPEECH DETECTION USING MULTIPLE ACOUSTIC SENSORS

CROSS-REFERENCE TO RELATED APPLICATIONS

This application claims the benefit under 35 U.S.C. § 119(e) of the filing data of U.S. Patent Application No. 63/310,371, for SPEECH DETECTION USING MULTIPLE ACOUSTIC SENSORS, which was filed on Feb. 15, 2022, and which is incorporated here by reference.

BACKGROUND

Voice activity detection (VAD) technology includes software and/or hardware for detecting the presence of speech in audio data. Personal computing devices, such as wearable computing devices including earbuds, augmented reality or virtual reality ("AR"/"VR") headsets or glasses, and smartwatches, can use VAD technology. One example application is hotword detection. When enabled for hotword detection, a device receives input audio data and classifies the audio data as either including a predetermined hotword or not including a predetermined hotword. A device classifying input audio data as including a hotword can proceed to enable a voice interface for interacting with the device using spoken commands and queries.

One challenge with enabling and effectively using voice interfaces is accurately responding to only speech originating from a particular wearer, such as a wearer of a device with hotword detection enabled. Other sources of speech not from the wearer, such as from speakers (human or electronic) should not trigger hotword detection in the device or cause its voice interface to be enabled. Classifying audio input based on the presence of speech alone does not account for non-wearer source speech and can lead to a device enabling a voice interface or processing input through a voice interface that is not from the wearer.

A further challenge for accurate hotword detection and voice interface input from only a wearer of a VAD-enabled device is the limitation of sensors, compute resources, and energy to power the device. Dedicating specialized sensors for collecting input data places significant design and operation constraints on devices such as earbuds or headsets, which are often already relying on limited battery life to perform other functions.

BRIEF SUMMARY

Aspects of the disclosure relate to voice activity detection (VAD) on wearable and other resource-constrained devices, to classify speech recorded by a microphone of the device as belonging to a wearer of the device versus another speech or audio source. A computing device can include a microphone and an inertial measurement unit (IMU). An IMU can be designed with a number of different sensors of varying levels of precision. Aspects of the disclosure provide for correlating measurements taken from an IMU with audio input data to perform a three-way classification of the audio as either belonging to speech from a wearer of the device, speech from a non-wearer of the device, or non-speech audio. Measurements from the IMU can be pre-processed to remove certain data predetermined to not assist in performing VAD to classify when a device-wearer is speaking. Devices implementing an IMU, for example for motion-tracking, can be augmented according to aspects of the disclosure for performing VAD.

Aspects of the disclosure provide for a computing device including: a microphone; an inertial measurement unit (IMU) including an accelerometer; and one or more processors configured to: receive, from the microphone, input audio data; receive measurement data including a plurality of signals from the accelerometer; pre-process the measurement data to remove one or more signals predetermined to be not indicative of speech activity; and classify, based on the input audio data and the measurement data, the input audio data as either not including speech, including speech from a wearer of the computing device, or including speech from a speech source that is not the wearer of the computing device.

Aspects of the disclosure provide for a system including: a microphone; a computing device including an inertial measurement unit (IMU) including an accelerometer; and one or more processors configured to: receive, from the microphone, input audio data; receive measurement data including a plurality of signals from the accelerometer; pre-process the measurement data to remove one or more signals predetermined to be not indicative of speech activity; and classify, based on the input audio data and the measurement data, the input audio data as either not including speech, including speech from a wearer of a computing device including the IMU, or including speech from a speech source that is not the wearer of the computing device.

Aspects of the disclosure provide for one or more non-transitory computer-readable storage media storing instructions that when executed by one or more processors, cause the one or more processors to perform operations including: receive, from a microphone, input audio data; receive measurement data including a plurality of signals from an accelerometer of an inertial measurement unit (IMU); pre-process the measurement data to remove one or more signals predetermined to be not indicative of speech activity; and classify, based on the input audio data and the measurement data, the input audio data as either not including speech, including speech from a wearer of a computing device including the IMU, or including speech from a speech source that is not the wearer of the computing device.

These and other aspects of the disclosure can include one or more of the following features, alone or in combination. In some examples, aspects of the disclosure provide for all of the following features, together.

The IMU includes a gyroscope or a magnetometer; and wherein to pre-process the measurement data, the one or more processors are further configured to remove the one or more signals in the measurement data generated by the gyroscope or the magnetometer.

To pre-process the measurement data, the one or more processors are further configured to remove the one or more signals related to motion components from the measurement data.

Removing the one or more signals related to motion components from the measurement data includes removing signals at or below a predetermined threshold.

The IMU includes a plurality of sensors, including the accelerometer, and wherein signals from the plurality of sensors are received as a stream of data by the one or more processors.

The one or more processors are further configured to synchronize the input audio data and the pre-processed measurement data based on timestamps indicating the times at which the pre-processed measurement data and the audio input data was recorded.

The input audio data includes an audio segment recorded by the microphone over an interval of time, wherein the measurement data is measured by the IMU at or within a predetermined threshold of the interval of time; and wherein in classifying, based on the input audio data and the measurement data, the input audio data, the one or more processors are further configured to: identify a correlation between the measurement data and the audio segment; and classify, based on the identified correlation, the input audio data as either not including speech, including speech from the wearer of the computing device, or including speech from a speech source that is not the wearer of the computing device.

The measurement data includes energy values at one or more frequency bands represented in the measurement data and in the audio segment; and wherein in identifying the correlation, the one or more processors are configured to identify a correlation between energy values at the one or more frequency bands represented in the measurement data and energy values at the one or more frequency bands represented in the audio segment.

The computing device is a wearable computing device, the computing device including a housing that houses at least one of the microphones, the IMU, and the one or more processors.

The IMU is positioned in the housing such that the IMU is near a location of the body of the wearer from which the IMU can register vibrations from the voice of the wearer when worn.

BRIEF DESCRIPTION OF THE DRAWINGS

Like reference numbers in the drawings indicate elements.

DETAILED DESCRIPTION

Overview

Figure 1:
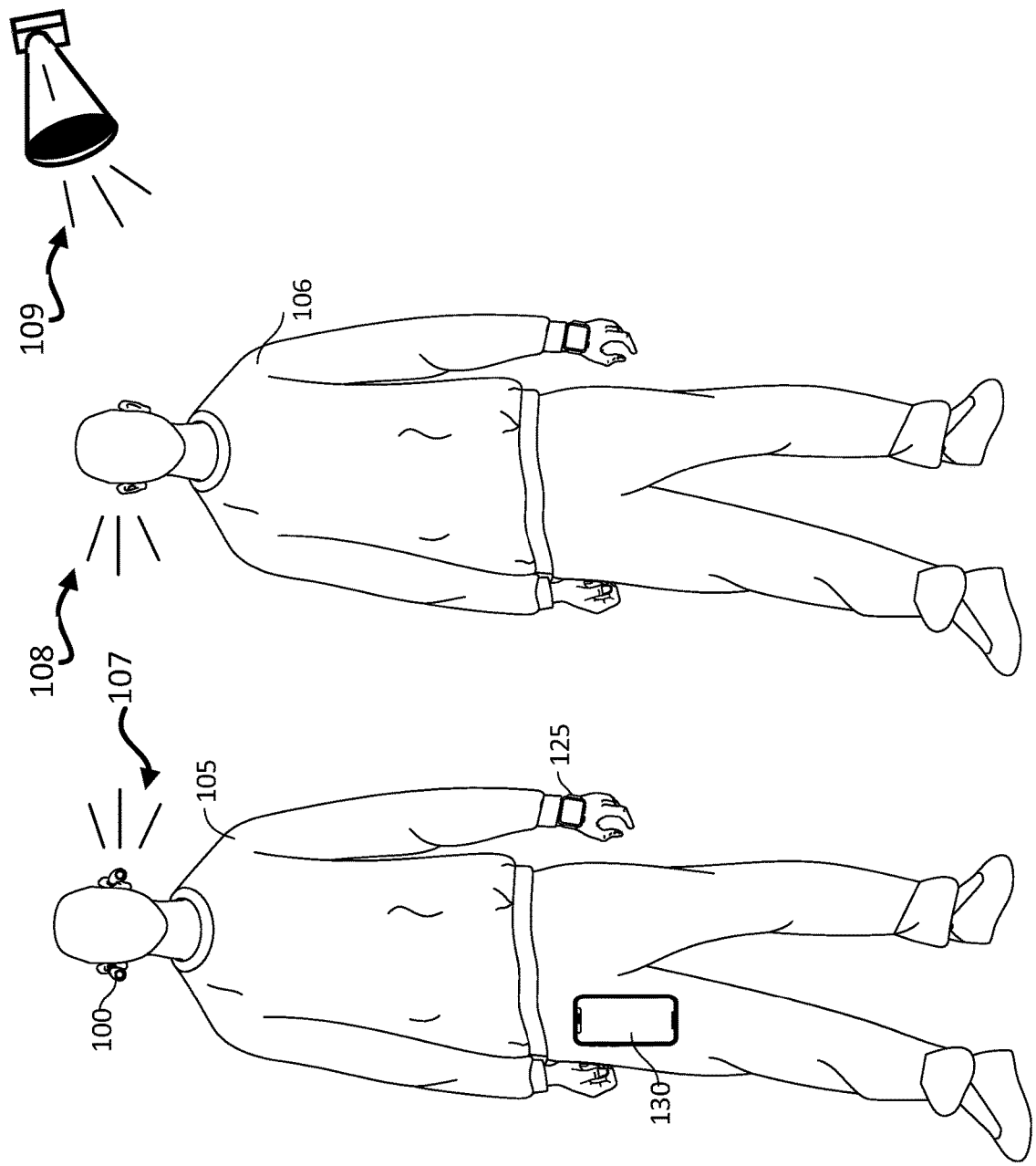
FIG. 1 is a pictorial diagram of an example computing device implementing a VAD engine, according to aspects of the disclosure.

Aspects of the disclosure relate to voice activity detection (VAD) on wearable and other resource-constrained devices, to classify speech recorded by a microphone of the device as belonging to a wearer of the device versus another speech source. A computing device can include a microphone and an inertial measurement unit (IMU). An IMU is a device including one or more sensors, such as gyroscope, accelerometer, magnetometer, etc., for measuring motion. The device can use signals measured by the IMU for providing motion-tracking features, such as head tracking for augmented reality or virtual reality applications. An IMU can be designed with a number of different sensors of varying levels of precision. Aspects of the disclosure provide for a device for leveraging existing data collected for these motion-tracking features for use in VAD. A device can pre-process data streamed from an IMU to use only signals predetermined to be indicative of whether or not a wearer of the device is speaking.

The device can receive a stream of IMU measurements and remove signals at or below a certain predetermined frequency threshold, for example below 80 Hz depending on, for example, electrical or thermal characteristics of the device, as being indicative of activities performed by a device wearer that do not relate to speech, such as exercising, riding in a car, etc. Measurements from certain types of sensors in the IMU, such as from a gyroscope or a magnetometer, can also be removed during pre-processing as measurements from types of sensors that have been predetermined to not be indicative of whether or not the wearer of the device is speaking.

A device as described herein can synchronize input audio data and measurement data from the IMU to correlate values of the data at different points in time. At least in part using this correlation, the system can more accurately classify whether detected speech is from the wearer of the device, for example by correlating spikes in values of the received measurement data with values of a segment of detected audio in the input audio data. In addition, this correlation can also improve classification of speech versus non-speech noises, such as from chewing, sneezing, humming, muttering, etc., performed by the wearer.

Aspects of the disclosure provide for more accurate VAD without the need for specialized sensors, such as voice accelerometers. IMUs, by contrast, are generally easier and less expensive to implement, and also consume less energy for processing sensor data from the IMU and input audio data from the microphone for performing VAD. Further, reducing the amount of data processed by a VAD engine as described herein further improves energy efficiency over processing all of the data from the IMU.

The device can implement a machine learning or statistical model for performing VAD, referred to as a classifier. The classifier can be trained on the relatively narrower frequency range of an IMU, versus requiring a wider frequency range typically only available to specialized voice accelerometers. A VAD engine implementing the classifier can perform full spectrum analysis on the input audio data, for example from a range of 80 Hz to 4 or 8 KHz. The classifier can correlate the received input audio data with signals received by the IMU to determine whether the wearer of a device or someone other than the wearer is speaking.

The VAD engine as described herein can be implemented in conjunction with a variety of different types of IMUs, and at varying levels of precision. By contrast, systems trained on data collected from voice accelerometers or other specialized sensors are more limited in their applicability to devices with less sophisticated measuring devices, such as IMUs.

The VAD engine can be used to augment existing functionality of a device implementing an IMU for non-VAD purposes, such as motion-tracking related features. In other words, existing device designs can be augmented to implement the VAD engine as described herein, at least because the VAD engine can pull from the same stream of data generated by an IMU for enabling the motion-tracking related features.

Aspects of the disclosure can provide for at least the following technical advantages. Voice activity detection and three-way classification of incoming audio data as: (i) not including speech, (ii) including speech of a wearer, or (iii) including speech of a non-wearer, can be accurately performed without specialized microphones or sensors. This three-way classification can be used for improved hotword or voice command detection, for example by reducing the number of false positives caused by incorrectly classifying non-wearer speech as originating from the wearer. The improved classification as described herein can also be used to improve the detection of the wearer engaging in conversation. The VAD engine as described herein can provide for improved conversation detection such as speech translation, hotword/voice command detection, automatically pausing or lowering the volume of audio streaming through speakers of the device while the wearer is conversing, as examples.

The VAD engine can be implemented in devices with a variety of different types of microphones and IMUs, which collect measurement data that can also improve how the VAD engine is trained using supervised machine learning techniques. More training data can be made available across a variety of different bandwidth or signal-to-noise ratios, which includes input audio data received from microphones, as well as measurement data from IMUs. For instance, implementations of the VAD engine can be trained with data from IMUs with lower bandwidths, for example 1 KHz or lower. As a result, the VAD engine can be implemented on a wider variety of devices than other types of VAD technology using specialized sensors such as voice accelerometers. In addition, latency, for example the time to detect a hotword or voice command, can also be reduced over other approaches, at least because less computationally complex sensors can be used to collect audio and measurement data.

In some examples, the VAD engine as described herein can be implemented on devices with different types of IMUs varying, for instance: in bandwidth, for example, the range of frequencies that can be registered by the IMU; output data rate (ODR), for example, the amount of data the IMU can transmit per second; and sensitivity, for example expressed in terms of gravity, which can range for instance from 2G-16G.

In some examples, the IMU can support multiple components, for example components receiving measurements from the IMU. Each component (referred to as a "client") can receive information at different sampling rates, sensitivities, or along a different number of channels. Output from the IMU across a multi-client interface can be multi-channel Linear Pulse Code Modulation (LPCM). LPCM can include a channel per IMU axis recorded, for example, in 3D-space along the x-, y-, and z-axis). Aspects of the disclosure provide for determining which axis provides the best signal-to-noise ratio for voice detection, which can vary for different IMU models, the position or orientation of the IMU relative to the device housing the IMU, and/or the anatomy of the wearer.

Example Systems

FIG. 1 is a pictorial diagram of an example computing device 100 implementing a VAD engine, according to aspects of the disclosure. A wearer 105 is wearing the computing device 100. While the computing device 100 is shown as earbuds in FIG. 1, it should be understood that the computing device 100 may be any of a number of other types of devices, such as headsets, smart glasses, smart motorcycle helmet, smart watch, etc. Moreover, the computing device 100 may include a plurality of devices in communication with one another, such as a smartwatch 125 or a mobile device 130 in communication with wireless earbuds.

As depicted in FIG. 1, the wearer 105 may be in a conversation with a non-wearer 106. The computing device 100 also includes an IMU, as described in more detail herein with reference to FIGS. 2A-3.

The computing device 100 may implement hotword detection, wherein the device responds to a particular word or phrase (for example, "hey, assistant") spoken by a wearer without any other manual input, such as button presses. In some examples, the microphone may be powered in a low power or standby mode while awaiting detection of the hotword. The hotword detection feature may be enabled or disabled by the user. In addition or alternatively, the computing device 100 can implement a number of other features, such as, for example, speech translation, or automatically pausing or lowering the volume of audio streaming through speakers of the device while the wearer is conversing. The VAD engine 201 can be implemented in conjunction with any system that receives speech as input for processing that speech.

Upon detection of the hotword, the microphone may detect subsequent speech from the user. The speech may be a voice command, such as "turn up the volume" or "shuffle songs on my favorite playlist." In other examples, the speech may be dialogue to be transmitted over a network, such as during a telephone conversation with another wearer. A response to the input may be output to the wearer, such as by playing sounds through a speaker. In some cases, the output may include a display, such as for displaying images, text, videos, status information, or any other type of information.

The computing device implements a VAD engine, which may accurately classify speech as originating from the wearer 105 or from a non-wearer. The microphone on the computing device 100 receives input audio data. For example, the input audio data can include speech 107 from the wearer 105, speech 108 from the non-wearer 106, background noise 109, or no audio at all (for example, no noise within sensor range made in the environment proximate to the computing device 100). The IMU also records measurements from sensors on the IMU, including from linear accelerometers, gyroscopes, and magnetometers, described herein.

The computing device 100 receives the input audio data and pre-processed signals from the IMU. The computing device pre-processes the signals from the IMU to remove signals predetermined to not be indicative of detecting voice activity, as described in more detail herein. Based on the received input audio data and the pre-processed signals, the computing device classifies the data as either including speech 107, speech 108 from a non-wearer 106, or no speech at all (for example, background noise 109). As described herein, the device 100 can implement a VAD engine implementing a statistical or machine learning model trained for VAD using input audio data.

After classifying the source of the speech, for example as either speech 107 from the wearer 105, speech 108 from a non-wearer 106, or background noise 109, the computing device 100 can pass the classification to a downstream process. For example, the computing device 100 can perform hotword detection to determine whether the speech 107 classified as originating from the wearer 105 contains a hotword or phrase for activating a voice interface for the computing device. The classified speech can also be used for other applications, such as for translating speech 108 to a different language. In some examples, the computing device 100 can implement a voice translation service that translates incoming speech classified as not originating from the wearer.

Figure 2A:
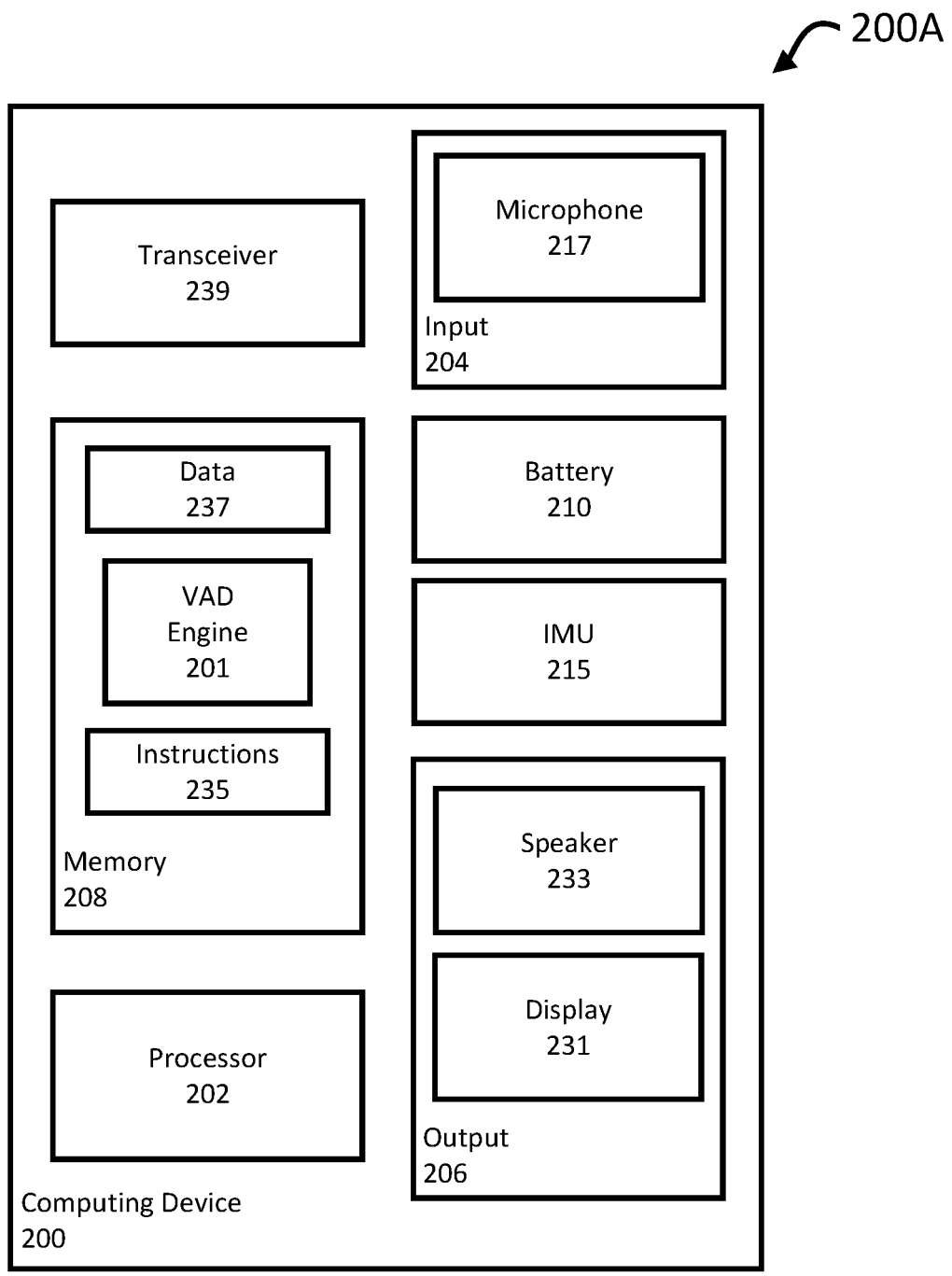
FIG. 2A is a block diagram of a computing device implementing a VAD engine according to aspects of the disclosure.

FIG. 2A is a block diagram 200A of a computing device 200 implementing a VAD engine 201 according to aspects of the disclosure. The computing device 200 can include a processor 202, input 204, output 206, memory 208, a battery 210, an IMU 215, and a transceiver 239.

The IMU 215 can be implemented within a housing of the computing device 200. The position of the IMU 215 within the computing device 200 can vary from implementation to implementation. For example, when the computing device 200 is a headset or pair of glasses, the IMU 215 can be positioned at or near a part of the computing device 200 resting on the nose of the wearer when worn. In this example, the positioning of the IMU 215 is more sensitive to movements of the wearer's nose where it is more likely for position and movement activity to be recorded when the wearer is speaking. In other examples, the IMU 215 can be positioned in or near the opening of the ear canal of a user. In general, the IMU 215 can be positioned anywhere near the face and/or ears of the user, such that speech vibration excites the IMU 215.

The bandwidth of the IMU 215 can vary from implementation to implementation. In some examples, the bandwidth of the IMU is 1 KHz or lower. Aspects of the disclosure provide for performing VAD with an IMU even with a low sampling rate, such as 1 KHz. The bandwidth of the IMU 215 can be much lower than the bandwidth of the microphone 217. Aspects of the disclosure provide for accurate classification of the source of detected speech in input audio data, even when there is a difference in bandwidth between the microphone and the IMU. A larger variety of microphone and IMU designs and build types can be substituted, allowing for implementation of the VAD engine 101 on more devices than what would be possible in approaches requiring specialized or highly sensitive sensors.

Figure 2B:
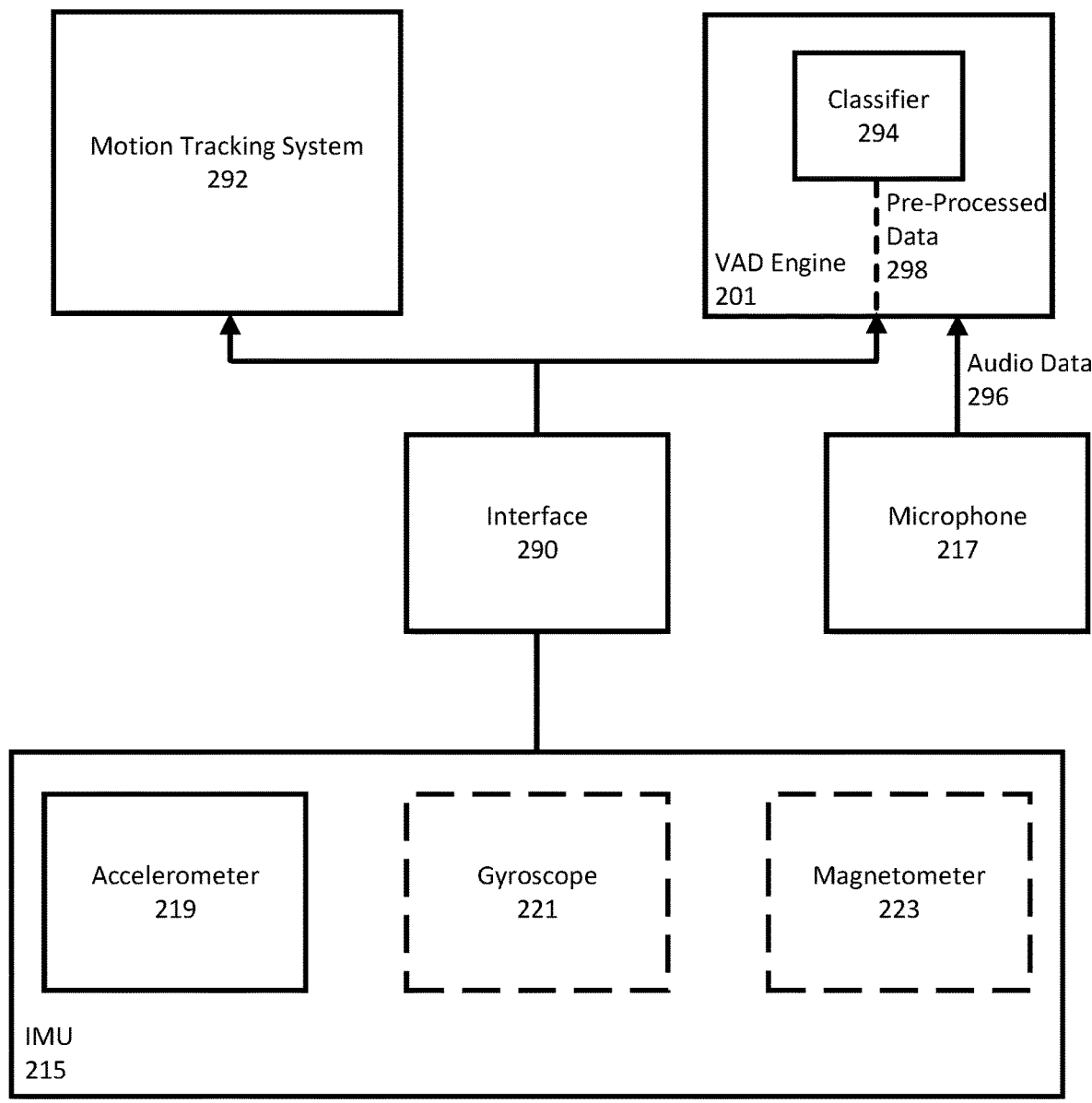
FIG. 2B is a block diagram of an IMU streaming signals over an interface to a motion tracking system and the VAD engine.

The IMU 215 can include a number of sensors, for example accelerometers, gyroscopes, and magnetometers, as shown and described with reference to FIG. 2B. The IMU 215 can collect measurements as one or more signals from various sensors. The measurements can characterize detected motion along different axes. As shown in FIG. 2B, an example accelerometer 219 can measure linear acceleration, for example in meters per second squared ($m/s^2$). A gyroscope 221 can measure angular velocity, for example in degrees per second or radians per second. A magnetometer 223 can measure magnetic field strength, for example in microTesla units or Gauss units, and for example using the Hall Effect or Magneto-resistive effect. The IMU 215 can be a microelectrical mechanical (MEMS) system. The sensors of the IMU can be calibrated to adjust for bias and noise. Bias can vary depending on a number of factors, for example environmental factors such as environmental temperature at which the IMU 215 is operating. A bias value can be approximated to account for inaccuracy in sensor measurement as a result of these factors. Bandwidths for the IMU 215 and the microphone 217 can vary, for example 6.666 KHz for the IMU 215 versus 48 KHz for the microphone 217.

The VAD engine can receive, as input, audio input data from the microphone 217, and pre-processed or raw measurements from the IMU 215. The VAD engine can implement a machine learning model, such as classifier 294 as shown in FIG. 2B, trained to receive, as input, the audio input data and measurements from the IMU 215. The machine learning model, or other type of model trained as described herein, can generate as output a classification of the received input data as either: (1) speech originating from the wearer of the device 200, (2) speech originating from a non-wearer of the device 200 (for example, someone conversing with the wearer of the device 200, or (3) non-speech audio, such as background noise.

Figure 6:
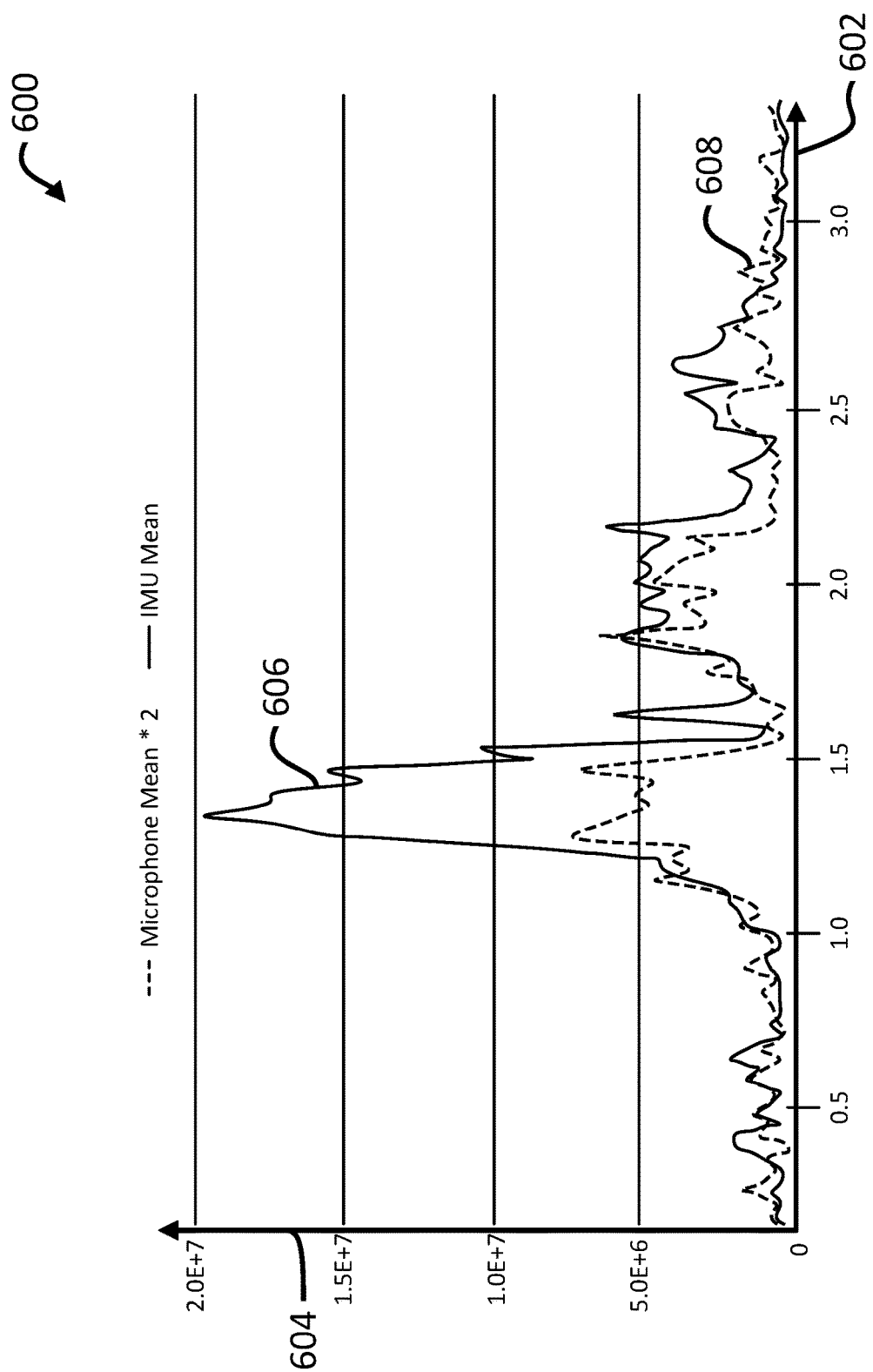
FIG. 6 is a graph showing a relationship between mean energy measured for an audio segment and mean energy from measurement data recorded by an IMU during an interval of time, according to an example.

In examples in which the IMU measurements are received raw by the VAD engine 101, the VAD engine 101 can be configured to pre-process the data. By pre-processing the data, it is meant that the data received from the IMU can be reduced to features that have been observed to correlate with speech activity by the wearer of a device implementing the IMU 215. For example, and as shown in FIG. 6, there is a correlation between mean energy measured from an audio segment and mean energy from measurement data recorded by an IMU at or near the same interval of time.

As another example, pre-processing can include filtering out certain frequencies of signals recorded by the IMU 215. For example, the VAD engine 101 can filter out signals at or below 80 Hz, based on observations that signals below that threshold are generally not found to be associated with voice activity. For example, the IMU 215 may record vibrations of mechanical motion, such as if the wearer 105 of the device 200 is in an automobile. On the other hand, the VAD engine 101 may also filter out signals above certain thresholds, such as 2 KHz or above. Signals above this threshold may be associated with electrical or thermal noise coming from the device 200 itself. These thresholds can be adjusted, for example, per-device, to account for different physical characteristics of the device on which the IMU is implemented.

As another example, pre-processing can include filtering or removing motion components of data recorded by the IMU 215. Filtering of this type can include, for example, removing measurements indicating a linear acceleration of the IMU 215 as a frequency and below a threshold, for example, below 50 Hz or below 80 Hz, or generally below an audible range or a range typical of human speech. Pre-processing can also include removing measurements from a magnetometer and/or a gyroscope implemented as part of the IMU 215. Reducing the amount of data received from the IMU 215 can improve the speed at which the VAD engine 101 classifies input audio.

Relying on linear acceleration of the IMU 215 can allow the VAD engine 101 to focus on recorded data from the IMU 215 most strongly correlated with speech from a device wearer. For example, while a wearer is speaking, the IMU 215 is likely to detect motion indicating that the wearer's jaw, throat, or facial muscles are moving, for example. The IMU 215 is less likely to register rotation or fluctuations in a magnetic field proximate to the wearer during speech, therefore removing measurements from a gyroscope or magnetometer can reduce data processing without sacrificing classification accuracy.

In some examples, the measurement data from the IMU 215 includes linear motion data characterizing the motion of the IMU 215 along different axes, for example an x-axis, y-axis, and/or z-axis of motion. The VAD engine 101, as part of pre-processing, can determine the axis along which the signal-to-noise ratio is the highest, and use motion data along that axis as the motion data passed as input to the VAD engine 101.

In some examples, because gravity pulls on the accelerometer 219 of the IMU 215, the VAD engine 101 can also remove the effect of gravity on measurements taken by the accelerometer 219, for example, by a known factor associated with the gravitational pull on the accelerometer 219.

As described with reference to FIG. 3, the VAD engine 101 can be a single client of multiple clients receiving data from the IMU 215. The IMU 215 can continue to collect information, including gyroscopic and/or magnetic field measurements, which may be used by a different client of the device 100, even if not used by the VAD engine 101.

The VAD engine 101 can be trained offline and implemented on the computing device 100. In some examples, the computing device 100 can query the VAD engine 101 implemented on a device separate from the microphone 217 and the IMU 215. The model implemented by the VAD engine 101 can be trained according to any of a variety of supervised learning techniques, such as backpropagation with stochastic, mini-batch, or batch gradient descent with model parameter update.

Training data received by the model for training can include audio samples and IMU measurement data collected at or near the same time as the audio samples. The training examples can be labeled with the correct classification of the audio samples, for example as either including speech or not including speech, and whether the source of speech is from a wearer of a device or not.

A device training the VAD engine can perform multiple iterations of backpropagation with gradient descent and model parameter update, until predetermined convergence criteria are met. The convergence criteria can include, for example, a maximum number of iterations of backpropagation, gradient descent, and model parameter update. The convergence criteria can additionally or alternatively define a minimum improvement between training iterations, for example measured by a relative or absolute reduction in the computed error between output predicted by the VAD engine and corresponding ground-truth labels on training data reserved for validation. In some examples, the VAD engine 101 can be trained for a number of epochs with early stopping where a validation error is not improved after a predetermined number of epochs. Other convergence criteria can be based on a maximum amount of computing resources allocated for training, for example a total amount of training time exceeded, or total number of processing cycles consumed, after which training is terminated.

Once trained, the VAD engine 101 can be implemented according to any of a variety of techniques for model inference on a resource-constrained device. For example, learned model parameter values can be quantized, and/or the VAD engine can be further tuned, for example using dropout or another applicable technique, for reducing the size of the model.

The computing device 200 can receive additional training data in the form of data provided by the wearer 105. For example, the device 100 can prompt the wearer 105, for example, audibly, to perform a variety of different activities while the IMU of the computing device receives data. In one instance, the wearer 105 can speak a voice command or hotword to the computing device 200, and the computing device can further train the VAD engine 201 according to training data obtained while the wearer 105 is speaking, with labels indicating that the data is of the wearer 105 speaking a command or hotword. The computing device 200 can repeat this process for different voice activities, for example, whispering, shouting, or talking at a normal volume. For each instance, the device 200 can obtain measurement data from the IMU 215. The VAD engine 201 can be trained or updated using this data, which can further improve the accuracy of the VAD engine 201 in distinguishing the wearer 105 as a source of speech from other sources of sound that are not the wearer 105.

Processor 202 may be any type of processor, such as commercially available microprocessors. The processor 202 can include one or more central processing units (CPUs), graphic processing units (GPUs), field-programmable gate arrays (FPGAs), and/or application-specific integrated circuits (ASICs), such as tensor processing units (TPUs). Although FIG. 2 illustrates the processor 202, memory 208, and other elements of the computing device 200 as being within the same respective blocks, it will be understood by those of ordinary skill in the art that the processor or memory may actually include multiple processors or memories that may or may not be stored within the same physical housing. Similarly, the memory 208 may be a hard drive or other storage media located in a housing different from that computing device 200. Accordingly, references to a processor or computing device will be understood to include references to a collection of processors or computing devices or memories that may or may not operate in parallel.

Memory 208 may store information that is accessible by the processor 202, including instructions 235 that may be executed by the processor 202, and data 237. The memory 208 can also include data 237 that can be retrieved, manipulated, or stored by the processor 202. The memory 208 may be of a type of memory operative to store information accessible by the processors 202, such as volatile or non-volatile memory, including non-transitory computer-readable media, or other media that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 235 and data 237 are stored on different types of media.

Data 237 may be retrieved, stored, or modified by the processor 202 in accordance with the instructions 235. For instance, although the present disclosure is not limited by a particular data structure, the data 237 may be stored in computer registers, in a relational database as a table having a plurality of different fields and records, stored, for example as: JSON, YAML, proto, or XML documents. The data 237 can also be formatted in a computer-readable format such as, but not limited to, binary values, ASCII or Unicode. The data 237 may also be formatted in a computer-readable format such as, but not limited to, binary values, ASCII, or Unicode. In other examples, the data 237 may be stored as bitmaps comprised of pixels that are stored in compressed or uncompressed, or various image formats (e.g., JPEG), vector-based formats (for example, SVG) or computer instructions for drawing graphics.

The data 237 can be retrieved, stored, or modified by the processor(s) 202 in accordance with the instructions 235. Moreover, the data 237 may include information sufficient to identify the relevant information, such as numbers, descriptive text, proprietary codes, pointers, references to data stored in other memories (including other network locations) or information that is used by a function to calculate the relevant data.

The instructions 235 can include one or more instructions that when executed by the processor 202, causes the one or more processors to perform actions defined by the instructions. The instructions 235 can be stored in object code format for direct processing by the processor 202, or in other formats including interpretable scripts or collections of independent source code modules that are interpreted on demand or compiled in advance. The instructions 235 can include instructions for implementing the VAD engine 201 consistent with aspects of this disclosure. For instance, the instructions 235 detect when the wearer of the computing device is talking, not talking, or if detected speech is from a source other than the wearer is talking. For example, and as described in more detail with reference to FIG. 4, the instructions 235 provide for receiving input audio data; classifying the input audio data as either including speech or not including speech; determining whether speech is detected; in response to the determination, receiving measurement data from the IMU 215; and classifying, based on the input audio data and the measurement data, the input audio data as either including speech from the wearer of the computing device 200 or including speech from a speech source that is not the wearer of the computing device 200.

According to some examples, the instructions 235 may further provide for hotword detection and for enabling a voice interface in response to the detection of a hotword.

The input 204 can include any appropriate mechanism or technique for receiving input from a wearer, including the microphone 217. In some examples, wearer input can also be received from other peripherals, such as a keyboard, mouse, mechanical actuators, soft actuators, touchscreens, and sensors.

The battery 210 may be any type of small form-factor power supply for powering the components of the computing device 200. The battery 210 may supply power to the processor 202, microphone 217, IMU 215, etc. individually, such that any individual component may be powered down to preserve life of the battery 210 while other components remain powered on.

The output 206 may include, for example, a display 231, a speaker 233, or any combination of these or other outputs. According to some examples, the output 206 may provide an indication to the wearer when the microphone is powered on and receiving voice input.

The transceiver 239 may be used for communicating with other devices. For example, where the wearer is having a conversation, the transceiver 239 may be used to send the received voice of the wearer to another device and receive signals from the other device for output to the wearer through output 250.

For synchronizing the microphone 217 and the IMU 215, the VAD engine 201 can identify a cross-correlation of measurements of signals by the IMU 215, with input received from the microphone 217. For example, the VAD engine 201 can determine an offset time between the microphone 217 and the IMU 215 for synchronizing the two components by measuring the time between input received by the microphone 217, with a signal received by the IMU 215 and within the range of human speech frequency.

FIG. 2B is a block diagram of an IMU streaming signals over an interface 290 to a motion tracking system and the VAD engine. The IMU 215 includes an accelerometer 219 and can also include a gyroscope 221 and a magnetometer 223. Signals from the IMU can pass through to one of multiple clients, here shown as a motion tracking system 292 and the VAD engine 101.

Output from the IMU 215 across interface can be multi-channel Linear Pulse Code Modulation (LPCM). PCM can include a channel per IMU axis recorded, for example, in 3D-space along the x-, y-, and z-axis). Aspects of the disclosure provide for determining which axis provides the best signal-to-noise ratio for voice detection, which can vary for different IMU models, the position or orientation of the IMU 215 relative to the device 200 housing the IMU 215, and/or the anatomy of the wearer.

The motion tracking system 292 can be any of a variety of different systems for processing motion data received from the IMU 215. The motion tracking system 292 for example can be used as part of tracking the position and orientation of a device implementing the IMU within a certain space. The motion tracking system 292 can receive measurements from the IMU 215. The VAD engine 101 can receive measurements from the IMU 215 and pre-process the data before arriving at a classifier 294 trained to classify audio data 296 from the microphone 217, using the audio data 296 and the pre-processed data 298 as input. In some examples, the VAD engine 101 can filter measurement data from the IMU 215 by requesting only certain types of data over the interface 290, for example only data from the accelerometer 219.

In some examples, the filtered measurement data can be predetermined according to, for example minimum or maximum sampling rate, measurement sensitivity, e.g., how sensitive the IMU 215 is in detecting input, as well which axes X, Y, and Z from which measurements are collected by the accelerometer 219 are of interest. In some examples, if specific measurements along different axes are not needed, the IMU 215 can omit generating those measurements, to save on power consumption.

Figure 3:
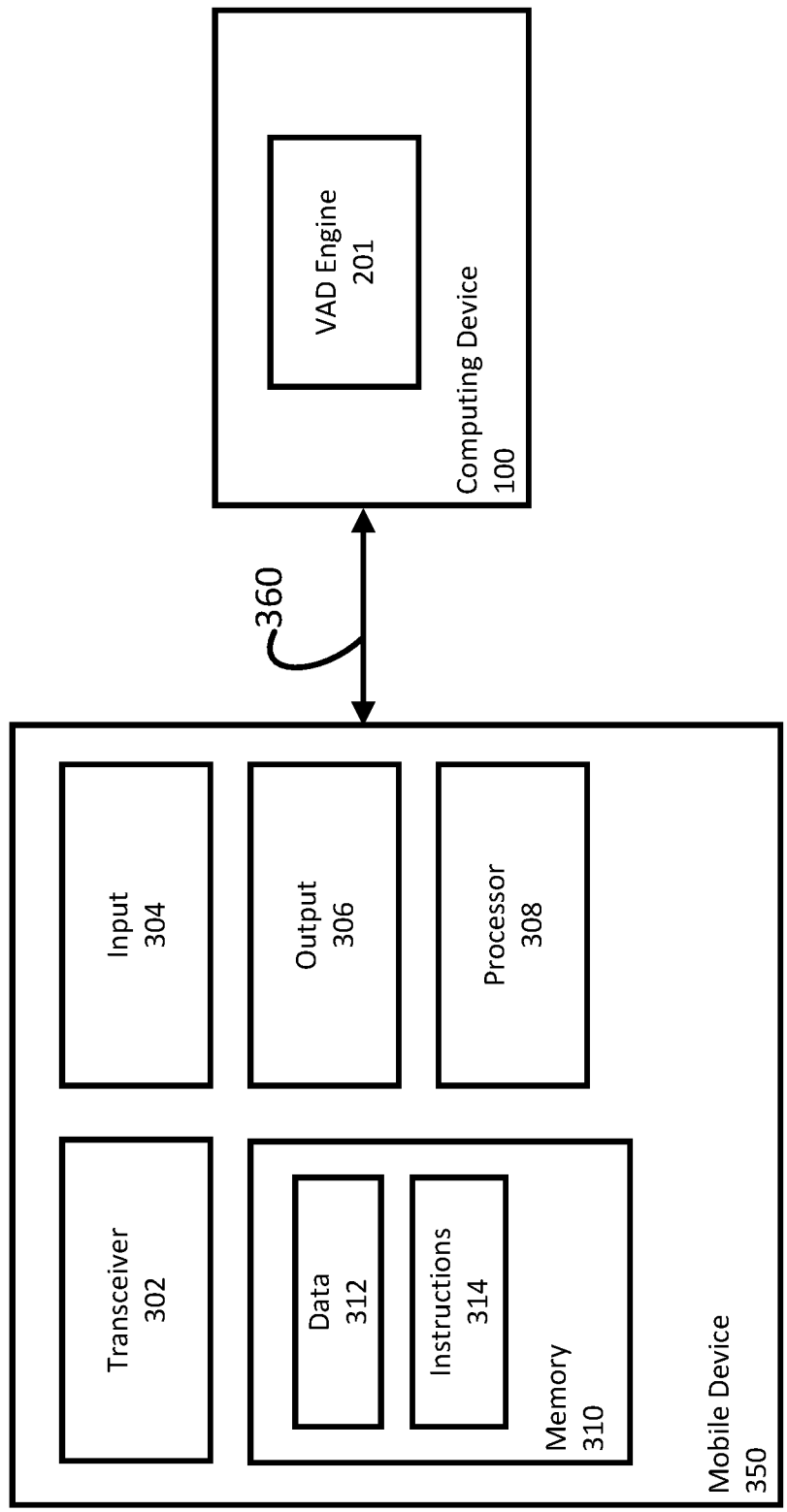
FIG. 3 is a block diagram of the computing device interacting with a mobile device.

FIG. 3 is a block diagram of the computing device 100 interacting with a mobile device 130. As with the computing device 100 described with reference to FIG. 2A, the mobile device 130 can include a transceiver 302, an input 304, an output 306, a processor 308, memory 310 that includes data 312 and instructions 314, and other components typically present in mobile computing devices and computing devices in general. While a number of components are shown, it should be understood that such components are merely non-limiting examples, and that other components may additionally or alternatively be included.

As mentioned above, the computing device 100 can be any of various types of devices, such as earbuds, head-mounted devices, smart watches, etc. The mobile device 130 can also take a variety of forms, such as smart phone, tablet, laptop, game console, etc.

In some examples, the computing device 100 may transmit the received speech to the mobile device 350. For example, the computing device 100 may transmit the speech using communication link 360. The devices 100, 350 can be capable of direct and indirect communication over the communication link 360. The devices 100, 350 can set up listening sockets that may accept an initiating connection for sending and receiving information. The communication link 360 itself can include various configurations and protocols including the Internet, World Wide Web, intranets, virtual private networks, wide area networks, local networks, and private networks using communication protocols proprietary to one or more companies. The communication link 360 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication.

In some examples, the computing device 100 may stream all audio to the mobile device 130, for performing hotword detection, enabling a voice interface, etc.

It should be understood that the computing device 100 and mobile device 130 may each include other components which are not shown, such as charging input for the battery, signal processing components, etc. Such components may also be utilized in execution of the instructions 235, 314.

Example Methods

Figure 4:
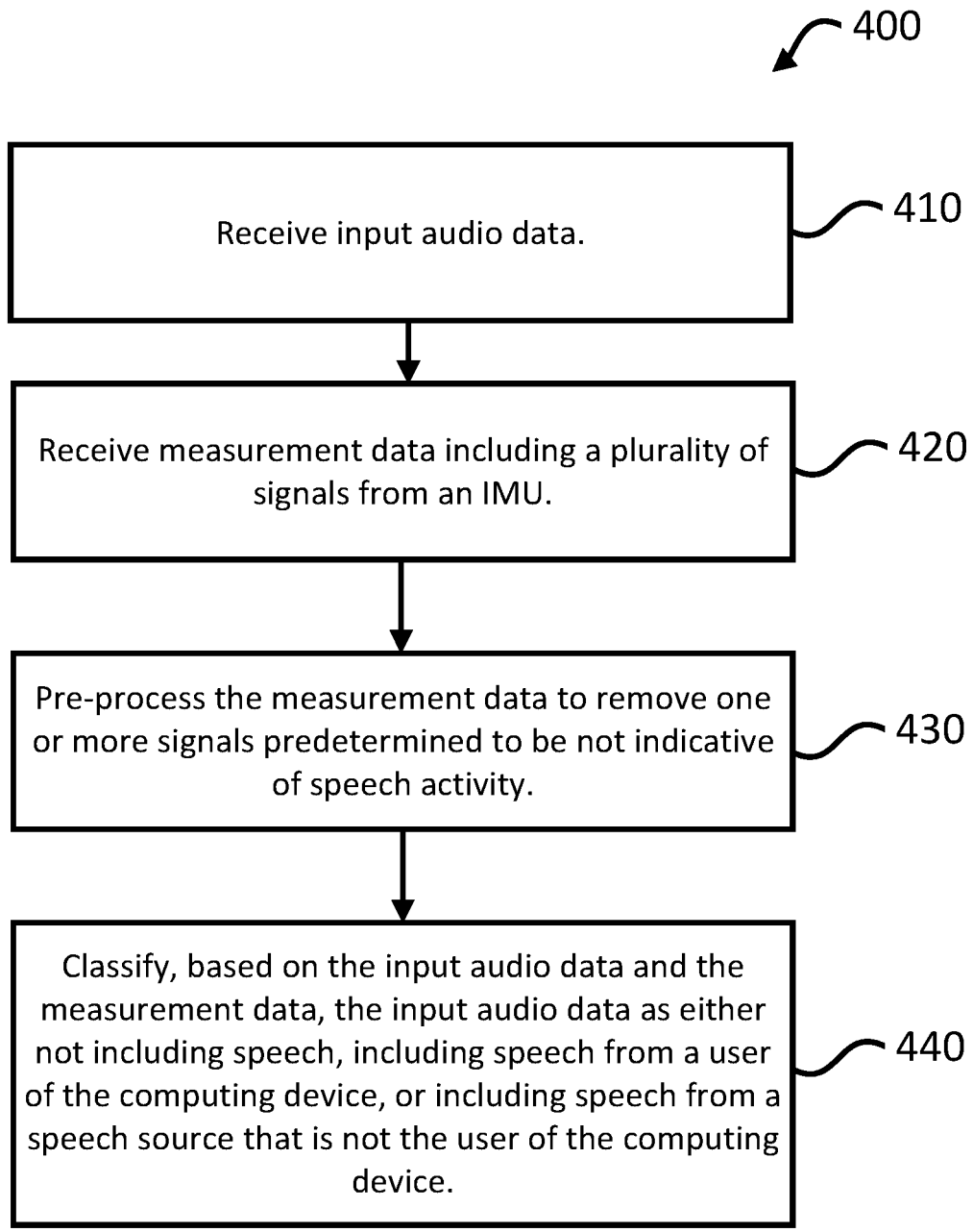
FIG. 4 is a flow chart of an example process for voice activity detection, according to aspects of the disclosure.

FIG. 4 is a flow chart of an example process 400 for voice activity detection, according to aspects of the disclosure.

The computing device receives input audio data, according to block 410.

The computing device receives measurement data including a plurality of signals from an inertial measurement unit (IMU), according to block 420.

The computing device pre-processes the measurement data to remove one or more signals predetermined to be not indicative of speech activity, according to block 430. As described herein, in some examples, the IMU can include a gyroscope, a magnetometer, or both.

As described herein with reference to FIG. 2A, to pre-process the measurement data, the computing device, using the VAD engine, can remove signals received from the gyroscope and/or the magnetometer. As another example of pre-processing, the computing device can remove motion components from the measurement data. To remove motion components, the computing device can remove signals at or below a predetermined threshold. The signals removed can be part of a single stream of data emitted by the IMU.

The computing device classifies, based on the input audio data and the measurement data, the input audio data as either not including speech, including speech from a wearer of the computing device, or including speech from a speech source that is not the wearer of the computing device, according to block 440.

Figure 5:
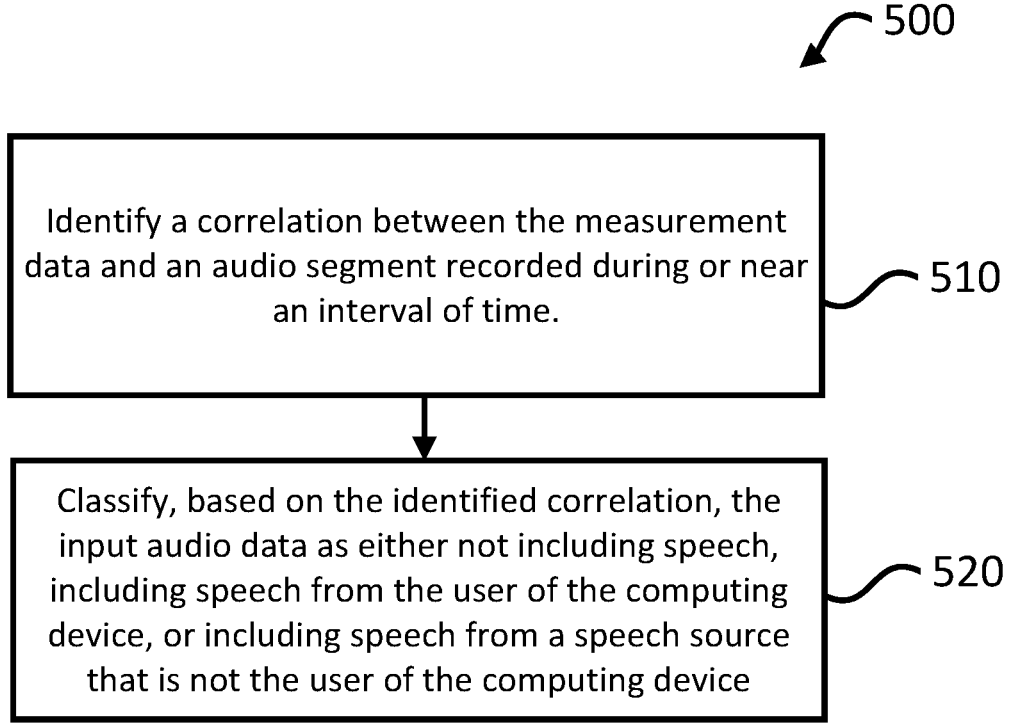
FIG. 5 is a flow diagram of an example process for using input audio data and measurement data from an IMU to classify the input audio data, according to aspects of the disclosure.

FIG. 5 is a flow diagram of an example process 500 for using input audio data and measurement data from an IMU to classify the input audio data, according to aspects of the disclosure.

The computing device identifies a correlation between the measurement data and an audio segment recorded during or near an interval of time, according to block 510.

The computing device classifies, based on the identified correlation, the input audio data as either not including speech, including speech from a wearer of the computing device, or including speech from a speech source that is not the wearer of the computing device, according to block 520.

In some examples, the computing device can be further configured to synchronize the input audio data and the pre-processed measurement data based on timestamps indicating the times at which the pre-processed measurement data and the audio input data was recorded.

As described herein and shown in FIG. 6, the measurement data from the IMU can include energy values at one or more frequency bands represented in the measurement data and in the audio segment; and wherein in identifying the correlation, the computing devices are configured to identify a correlation between energy values at the one or more frequency bands represented in the measurement data and energy values at the one or more frequency bands represented in the audio segment. For example, high energy values in the measurement data positively correlated with high energy values in the audio segment can be an indicator that the wearer of the device is speaking, versus another source of speech.

FIG. 6 is a graph 600 showing a relationship between mean energy measured for an audio segment and mean energy from measurement data recorded by an IMU during an interval of time, according to an example.

The x-axis 602 of the graph 600 plots time, in increments of half-seconds. The y-axis 604 plots mean energy levels recorded across a range of frequency bands between 47 and 321 Hz at different times in the interval. Solid curve 606 corresponds to measurement data of an IMU and dashed curve 608 corresponds to mean energy levels of an audio segment recorded by a microphone during the same interval of time.

The plotted data in the graph 600 was recorded by a microphone and an IMU of a device while a wearer spoke the phrase "test, one, two, three." The peaks of both the solid curve 606 and the dashed curve 608 correspond to points in time in which the wearer spoke one of the four words of the test phrase. The graph 600 shows a positive correlation between peaks in the curves 606, 608, which can be identified by the VAD engine and used to generate more accurate classifications as to whether or not the device wearer is speaking.

Depending on the positioning of the IMU on the device, the IMU may be able to record higher measurements for the utterance of certain words by the device wearer. The IMU may be positioned anywhere in the housing such that the IMU is near a location of the body of the wearer to detect vibrations from the speech of the wearer, when the device housing the IMU is worn. For example, when the IMU is positioned on the front piece of a device resting on the nose or the bridge of the nose a device wearer, certain words, such as the word "one" with a strong nasal component in the "n" may cause a higher peak to be measured by the IMU versus other words. In other examples, the IMU is positioned at or near the ear of the wearer, or at or near other parts of the face of the wearer when worn.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A computing device comprising:
   a microphone;
   an inertial measurement unit (IMU) comprising an accelerometer; and
   one or more processors configured to:
      receive, from the microphone, input audio data, the input audio data comprising:
         an audio segment recorded by the microphone over an interval of time; and
         energy values at one or more frequency bands represented in the audio segment;
      receive measurement data comprising a plurality of signals from the accelerometer, the measurement data measured by the IMU at or within a predetermined threshold of the interval of time and comprising energy values at one or more frequency bands represented in the measurement data;
      pre-process the measurement data to remove one or more signals predetermined to be not indicative of speech activity;
      synchronize the input audio data and the pre-processed measurement data based on timestamps indicating the times at which the pre-processed measurement data and the audio input data was recorded;
      identify a correlation between the energy values at the one or more frequency bands represented in the measurement data and the energy values at the one or more frequency bands represented in the audio segment; and
      classify, based on the input audio data, the measurement data, and the identified correlation, the input audio data as either not including speech, including speech from a wearer of the computing device, or including speech from a speech source that is not the wearer of the computing device.

2. The device of claim 1, wherein the IMU comprises a gyroscope or a magnetometer; and
   wherein to pre-process the measurement data, the one or more processors are further configured to remove the one or more signals in the measurement data generated by the gyroscope or the magnetometer.

3. The device of claim 1, wherein to pre-process the measurement data, the one or more processors are further configured to remove the one or more signals related to motion components from the measurement data.

4. The device of claim 3, wherein removing the one or more signals related to motion components from the measurement data comprises removing signals at or below a predetermined threshold.

5. The device of claim 1, wherein the IMU comprises a plurality of sensors including the accelerometer, and wherein signals from the plurality of sensors are received as a stream of data by the one or more processors.

6. The device of claim 1, wherein the computing device is a wearable computing device, the computing device comprising a housing that houses at least one of the microphones, the IMU, and the one or more processors.

7. The device of claim 6, wherein the IMU is positioned in the housing such that the IMU is near the location of the body of the wearer from which the IMU can register vibrations from a voice of the wearer when worn.

8. The computing device of claim 1, wherein the classifying of the input audio data as either not including speech, including speech from a wearer of a computing device comprising the IMU, or including speech from a speech source that is not the wearer of the computing device is performed by a machine-learned model.

9. A system comprising:
   a microphone;
   a computing device comprising an inertial measurement unit (IMU), the IMU comprising an accelerometer; and
   one or more processors configured to:
      receive, from the microphone, input audio data, the input audio data comprising:
         an audio segment recorded by the microphone over an interval of time; and
         energy values at one or more frequency bands represented in the audio segment;
      receive measurement data comprising a plurality of signals from the accelerometer, the measurement data measured by the IMU at or within a predetermined threshold of the interval of time and comprising energy values at one or more frequency bands represented in the measurement data;
      pre-process the measurement data to remove one or more signals predetermined to be not indicative of speech activity;
      synchronize the input audio data and the pre-processed measurement data based on timestamps indicating the times at which the pre-processed measurement data and the audio input data was recorded;
      identify a correlation between the energy values at the one or more frequency bands represented in the measurement data and the energy values at the one or more frequency bands represented in the audio segment; and
      classify, based on the input audio data, the measurement data, and the identified correlation, the input audio data as either not including speech, including speech from a wearer of a computing device comprising the IMU, or including speech from a speech source that is not the wearer of the computing device.

10. The system of claim 9, wherein the IMU comprises a gyroscope or a magnetometer; and
    wherein to pre-process the measurement data, the one or more processors are further configured to remove the one or more signals in the measurement data generated by the gyroscope or the magnetometer.

11. The system of claim 9, wherein to pre-process the measurement data, the one or more processors are further configured to remove the one or more signals related to motion components from the measurement data.

12. The system of claim 11, wherein removing the one or more signals related to motion components from the measurement data comprises removing signals at or below a predetermined threshold.

13. The system of claim 9, wherein the IMU comprises a plurality of sensors including the accelerometer, and wherein signals from the plurality of sensors are received as a single stream of data by the one or more processors.

14. The system of claim 13, wherein the system further comprises a motion tracking system, wherein the IMU is configured to pass the single stream of data to the motion tracking system; and
wherein the pre-processed measurement data is a subset of data streamed to the motion tracking system.

15. The system of claim 9, wherein the classifying of the input audio data as either not including speech, including speech from a wearer of a computing device comprising the IMU, or including speech from a speech source that is not the wearer of the computing device is performed by a machine-learned model.

16. One or more non-transitory computer-readable storage media storing instructions that when executed by one or more processors, cause the one or more processors to perform operations comprising:
receive, from a microphone, input audio data, the input audio data comprising:
an audio segment recorded by the microphone over an interval of time; and
energy values at one or more frequency bands represented in the audio segment;
receive measurement data comprising a plurality of signals from an accelerometer of an inertial measurement unit (IMU), the measurement data measured by the IMU at or within a predetermined threshold of the interval of time and comprising energy values at one or more frequency bands represented in the measurement data;
pre-process the measurement data to remove one or more signals predetermined to be not indicative of speech activity;
synchronize the input audio data and the pre-processed measurement data based on timestamps indicating the times at which the pre-processed measurement data and the audio input data was recorded;
identify a correlation between the energy values at the one or more frequency bands represented in the measurement data and the energy values at the one or more frequency bands represented in the audio segment; and
classify, based on the input audio data, the measurement data, and the identified correlation, the input audio data as either not including speech, including speech from a wearer of a computing device comprising the IMU, or including speech from a speech source that is not the wearer of the computing device.

17. The computer-readable storage media of claim 16, wherein:
the IMU comprises a gyroscope or a magnetometer; and
pre-processing the measurement data comprises removing the one or more signals in the measurement data generated by the gyroscope or the magnetometer.

18. The computer-readable storage media of claim 16, wherein pre-processing the measurement data comprises removing the one or more signals related to motion components from the measurement data.

19. The computer-readable storage media of claim 18, wherein removing the one or more signals related to motion components from the measurement data comprises removing signals at or below a predetermined threshold.

20. The one or more non-transitory computer-readable storage media of claim 16, wherein the classifying of the input audio data as either not including speech, including speech from a wearer of a computing device comprising the IMU, or including speech from a speech source that is not the wearer of the computing device is performed by a machine-learned model.

* * * * *